Figure 1:
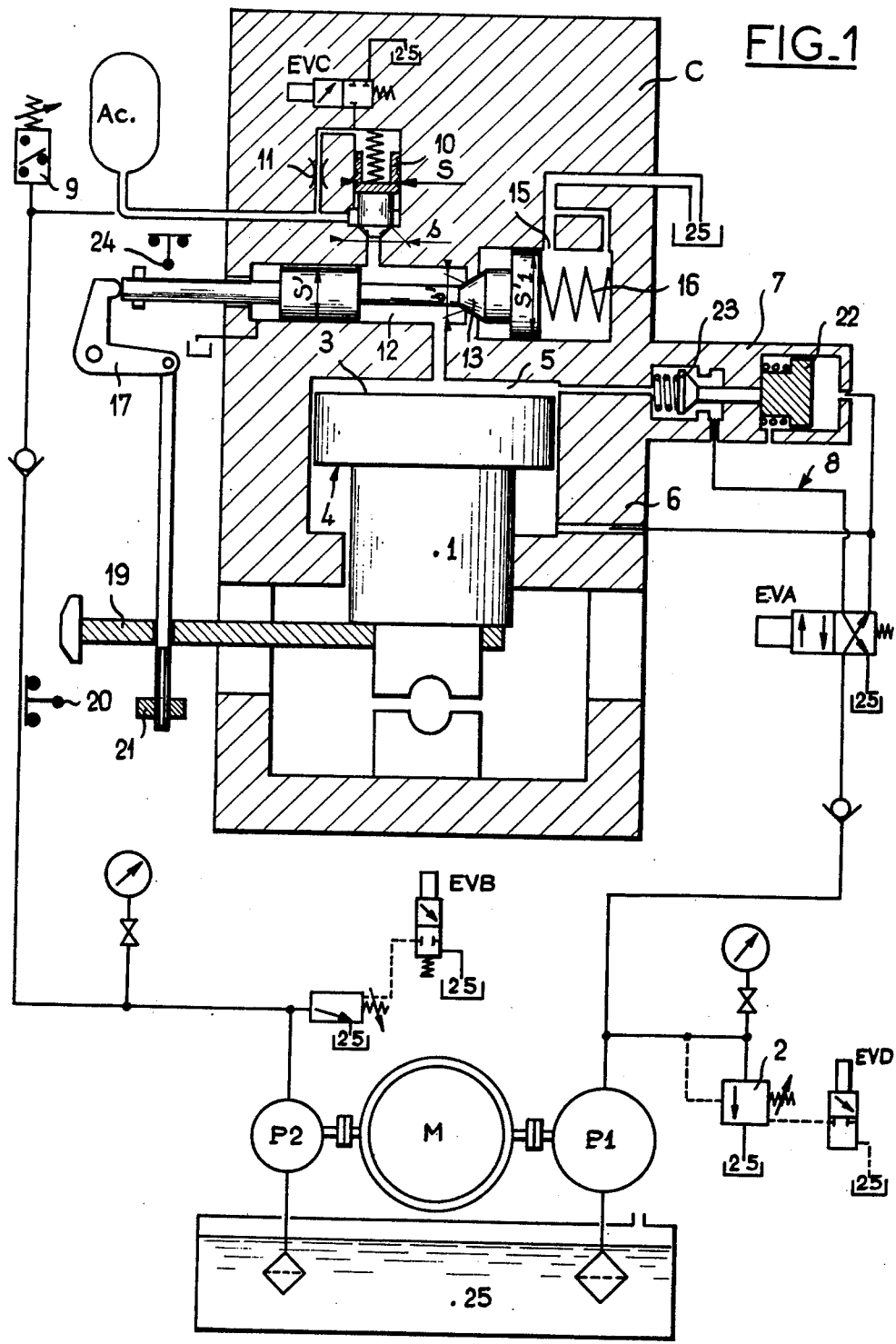

United States Patent [19]

Forichon

[11] 4,022,096
[45] May 10, 1977

[54] HYDRAULIC PRESSES, NOTABLY FOR SHEARING AND CUTTING MATERIALS

[75] Inventor: Gaston Sebastien Forichon, Alfortville, France

[73] Assignee: Societe des Anciens Ateliers H. Jambon, France

[22] Filed: Aug. 30, 1976

[21] Appl. No.: 718,536

[30] Foreign Application Priority Data

Sept. 10, 1975 France .................. 75.27694

[52] U.S. Cl. .................. 83/617; 83/639; 83/554; 100/48; 100/269 R
[51] Int. Cl.² .................. B26D 5/12; B30B 1/32
[58] Field of Search .................. 83/639, 617, 554; 100/48, 269 R

[56] References Cited

UNITED STATES PATENTS

| 3,388,168 | 6/1975 | Kent et al. | 83/617 |
| 3,827,328 | 8/1974 | La Flamme et al. | 83/617 |
| 3,908,496 | 9/1975 | Moelbert | 83/617 |

Primary Examiner—Donald R. Schran
Attorney, Agent, or Firm—Stevens, Davis, Miller & Mosher

[57] ABSTRACT

Hydraulic press for performing shearing, cutting and bloom-compression operations comprising a pressure-fluid accumulator operatively connected to the working chamber of the main piston having its rod rigid with a slide member coupled via linkage means and a bell-crank lever to the longitudinal stem of a spool valve movable in a spool valve chamber communicating via a first port to the fluid reservoir, via a second port to the accumulator and via a third port to the pressure chamber of the main piston.

5 Claims, 2 Drawing Figures

HYDRAULIC PRESSES, NOTABLY FOR SHEARING AND CUTTING MATERIALS

The present invention relates to hydraulic presses in general and has specific reference to a hydraulic press for performing shearing, cutting or compression operations.

It is frequently ncessary to operate hydraulic presses, especially those intended for shearing or cutting operations, under both maximum power and high speed conditions. For this purpose, a large fluid output must be delivered in a very short time and this can only be done by using an accumulator. This accumulator is chargd during idle time periods during ancillary operations such as the return stroke of the tools or the feeding of workpieces or materials to be sheared or cut, or blooms to be compressed.

The necessary fluid output must be properly controlled, to prevent the complete discharge of the accumulator, as well as undesired pressure drops below permissible values.

The accumulator action must be controlled as a function of the movements of the working piston and also of the idle periods thereof.

It is the primary object of this invention to provide a hydraulic press for preforming shearing or cutting operations, which is capable of meeting all the above-mentioned requirements.

The hydraulic press for preforming shearing or cutting operations according to this invention, which of the type comprising a press piston mounted for reciprocating motion in opposite directions in a hydraulic space divided into one chamber for the piston operating at the working pressure and another chamber for the return stroke of said piston, a reservoir for the working fluid, and a pressure-fluid accumulator for supplying fluid to the piston working chamber, the piston rod being rigid with a slide arm adapted to slide along a linkage terminating at one end with an adjustment nut, is characterised in that the accumulator communicates with the working chamber of the piston via a hydraulic circuit comprising essentially a normally closed spring-loaded valve and a chamber in which a spool valve is adapted to move transversely to the piston axis, this spool valve having a stem extension projecting axially outside the press control device, the outer end of this spool valve stem extension engaging one arm of a crank lever fulcrumed to a fixed pivot pin and having its other arm rigid with said linkage.

According to another feature characterising this invention, the chamber in which the spool valve is movable comprises a shoulder forming a seat for said valve with a first valve portion disposed on one side of said seat and the other portion of said valve disposed on the opposite side of said seat, said other portion supporting an annular shoulder forming a surface area greater than that registering with said first side of the seat.

Figure 2:
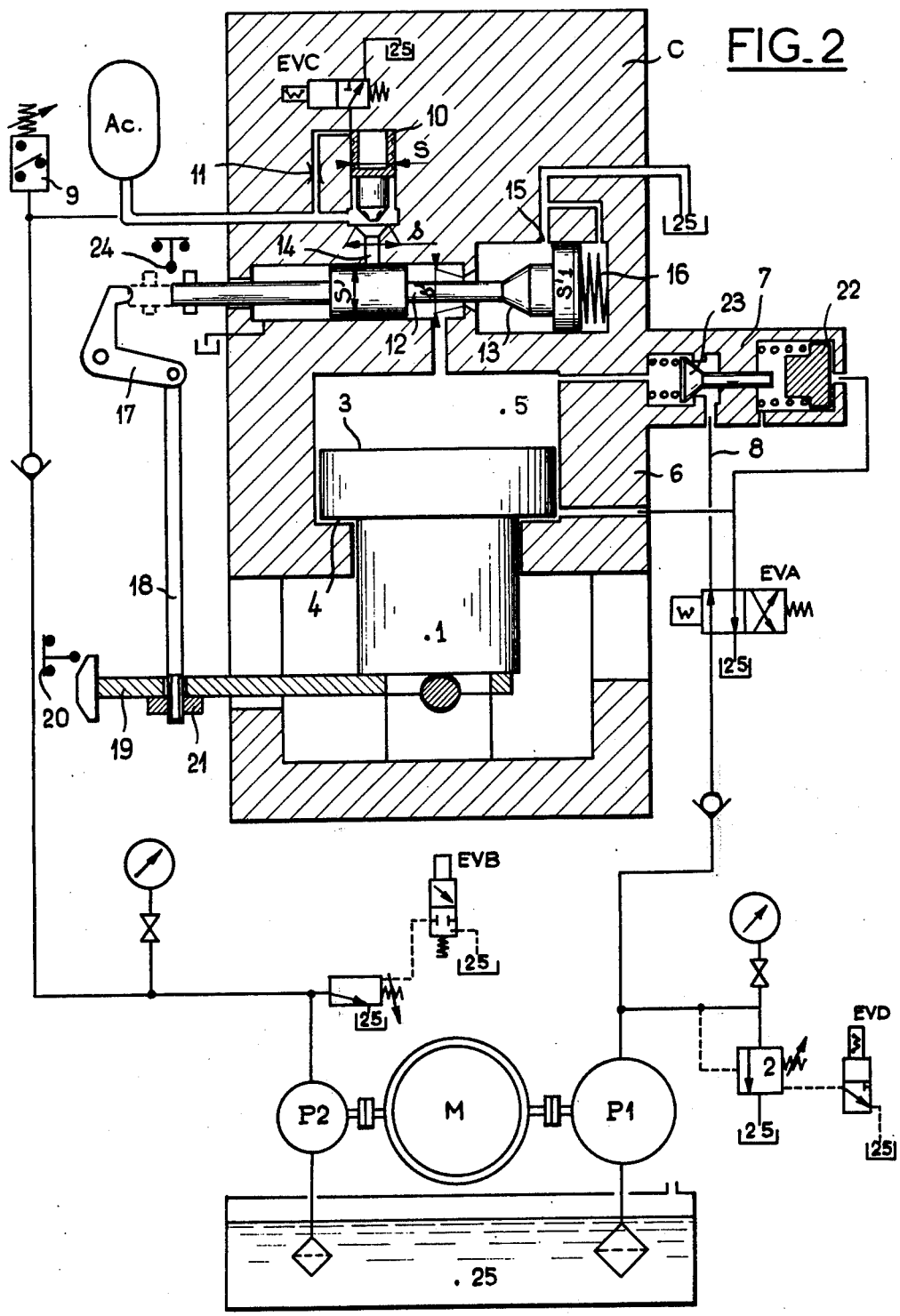

Other features and advantages of this invention will appear as the following description proceeds with reference to a typical form of embodiment of a hydraulic press constructed according to the teachings of this invention and given by way of example, not of limitation, with reference to the accompanying drawing, in which:

FIG. 1 illustrates diagrammatically this exemplary form of embodiment of a hydraulic press according to the invention, shown at the beginning of its working phase, and FIG. 2 illustrates the same hydraulic press during the return stroke of its piston.

As illustrated in the drawing, the hydraulic press according to this invention, of a type designed more particularly for shearing and cutting operations, comprises a main piston 1, and a motor M driving a pair of pumps $P_1$ and $P_2$. Pump $P_1$ actuates the main piston 1 and pump $P_2$ is intended for filling an accumulator AC. Pump $P_1$ controlled by its relief valve 2 actuates the main piston 1 via a solenoid valve EVA adapted to direct the hydraulic fluid under pressure alternatively against the active surface 3 of piston 1 or against its return surface 4.

Interposed between said solenoid valve EVA and the active chamber 5 of the main cylinder 6 in which piston 1 is slidably mounted is a monitored valve 7 adapted, during the return stroke, and in the inoperative position of piston 1, to establish a fluid connection between the active surface 3 thereof and a fluid reservoir 25. The monitored valve 7 is open during the first working phase due to the fluid pressure, and closed during the discharge of accumulator AC to prevent the latter from being discharged through the circuit 8 of pump $P_1$.

The other pump $P_2$ is adapted to inflate the accumulator AC up to a predetermined pressure. When this pressure, as detected by a pressure-responsive switch 9, is attained, the pump $P_2$ is connected to the reservoir 25 via a solenoid valve EVB energized through said switch 9. With this arrangement, the pump $P_2$ operates under zero pressure conditions during idle periods for the purpose of reducing the undesired heating of the hydraulic fluid.

A distribution and control unit C constituting the essential element of the present invention is connected to the accumulator AC and the active surface 3 of main piston 1. This unit comprises in fact a normally closed check valve 10 responsive to a solenoid valve EVC. As the output of this solenoid valve EVC exceeds that of a jet or gauged orifice 11 delivering hydraulic fluid continuously, a vacuum is created and valve 10 is opened since its cross-sectional area S is greater than the area s of its seat.

Operatively associated with check valve 10 is a spool valve device 12 controlling the communication between the accumulator AC and the working chamber 5 of main piston 1. This spool valve 12 comprises an integral valve member 13 engaging a seat having a cross-sectional surface area s' smaller than that S' of the main land of this spool valve, and another land rigid with said valve member 13 which has a cross-sectional surface area $S'_1$ greater than S'. It will be seen that an axial movement of spool valve 12 from its inoperative position (FIG. 1) will close a port 14 communicating with the accumulator AC (FIG. 2), whereafter this spool valve will uncover another port 15 communicating with the reservoir 25. This movement, while isolating the accumulator, AC, relieves the pressure exerted on the main piston 1 at the end of its working stroke and connects the pump $P_1$ to reservoir 25 due to the action of another solenoid valve EVD. A spring 16 subsequently restores the spool valve 12 to its initial position.

The stem of spool valve 12 projects on one side from the press structure and engages a bell-crank lever 17 fulcrumed about a fixed pivot pin; this lever 17 is actuated by a linkage 18 connected via a slide arm 19 to the main piston 1. This arm 19 is also adapted to actuate a switch 20 of which the position is adjustable according to work requirments. Furthermore, this arm 19 is adapted to engage the linkage 18 by means of a nut 21 adjustable therealong for terminating the working cycle.

Assuming that the press illustrated is a bloom shearing machine or a punching machine, its operation will take place as follows:

The press operation is controlled electrically by means of conventional control knobs (not shown).

The annular portion of the main piston 1 is connected to the reservoir 25 by actuating the solenoid valve EVA. Piston 22 is moved backwards and valve member 23 is free. The fluid flows via pipe line 8 into the working chamber 5 and piston 1 begins its operative downward stroke. The distribution and accumulator control unit C is inoperative.

When the slide arm 19 engages switch 20 (this switch having a predetermined position depending on the type of working operation to be accomplished) this switch 20 controls the solenoid valve EVC which opens the check valve 10 and releases the fluid from accumulator AC which is directed to the working surface 3 of working piston 1. Thus, piston 1 will continue and even accelerate its stroke, and when this stroke has attained the predetermined length the slide arm 19 engages the nut 21 which, via linkage 18 and bell-crank lever 17, moves the spool valve 12 to the right, as seen in FIG. 2.

The valve member engaging the seat 13 is unseated, whereby the pressure fluid is exerted on the surface $S'_1$ of greater diameter than surface $S'$. The spool valve 12 is self-driven, and closes the port 14 connected to the accumulator AC, whereafter the second land $S'_1$ of this spool valve 12 uncovers port 15 communicating with the fluid reservoir 25. During this movement switch 24 is actuated and causes the solenoid valves EVC, EVA, EVB and EVD to resume their initial positions.

The main piston 1 is restored likewise to its initial, upper position to start another working cycle.

With this arrangement high piston working speeds can be achieved, which is particularly advantageous for shearing operations since the work quality is improved considerably.

I claim:

1. In a hydraulic press for performing shearing or cutting operations, of the type comprising a press piston mounted for reciprocating motion in opposite directions in a hydraulic space divided into one chamber for the piston operating at the working pressure and another chamber for the return stroke of said piston, a reservoir for the working fluid, and a pressure-fluid accumulator for supplying fluid to the piston working chamber, the piston rod being rigid with a slide arm adapted to slide along a linkage terminating at one end with an adjustment nut, the accumulator communicates with the working chamber of the piston via a hydraulic circuit comprising essentially a normally closed spring-loaded valve and a chamber in which a spool valve is adapted to move transversely to the piston axis, said spool valve having a stem extension projecting axially outside the press control device, the outer end of this spool valve stem engaging one arm of a bell-crank lever fulcrumed to a fixed pivot pin and having its other arm rigid with said linkage.

2. Hydraulic press according to claim 1, wherein the chamber in which said spool valve is mounted comprises a seat-forming shoulder engaged by said valve, with a first land of said spool valve extending on one side of said seat and another land extending on the opposite side of said seat, said other land supporting an annular shoulder providing a cross-sectional surface area greater than that of said first side of said seat.

3. Hydraulic press according to claim 1, comprising a monitored valve adapted to connect one face of said main piston to a pump and the opposite face of said piston to the fluid reservoir.

4. Hydraulic press according to claim 1, wherein the chamber in which said spool valve is adapted to move comprises a first port communicating with the fluid reservoir, a second port communicating with the accumulator and a third port communicating with the pressure chamber of said main piston.

5. Hydraulic press according to claim 1, comprising an electric switch which is actuated by the movement of said spool valve and adapted to restore the various solenoid valves to their initial position.

* * * * *